United States Patent
Schindler

(10) Patent No.: US 9,914,367 B2
(45) Date of Patent: Mar. 13, 2018

(54) ENERGY MANAGEMENT FOR A MOTOR VEHICLE HAVING COUPLED ENERGY STORAGE DEVICES

(71) Applicant: Bayerische Motoren Werke Aktiengesellschaft, Munich (DE)

(72) Inventor: Moritz Schindler, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 332 days.

(21) Appl. No.: 14/665,072

(22) Filed: Mar. 23, 2015

(65) Prior Publication Data

US 2015/0191100 A1 Jul. 9, 2015

Related U.S. Application Data

(63) Continuation of application No. PCT/EP2013/069792, filed on Sep. 24, 2013.

(30) Foreign Application Priority Data

Sep. 24, 2012 (DE) .......................... 10 2012 217 184

(51) Int. Cl.
*B60L 11/00* (2006.01)
*B60L 11/18* (2006.01)
(Continued)

(52) U.S. Cl.
CPC ......... *B60L 11/1866* (2013.01); *B60L 11/005* (2013.01); *B60L 11/1838* (2013.01);
(Continued)

(58) Field of Classification Search
CPC combination set(s) only.
See application file for complete search history.

(56) References Cited

U.S. PATENT DOCUMENTS 5,455,463 A * 10/1995 Langnickel ........... H02J 7/1423
307/10.1
5,778,326 A 7/1998 Moroto et al.
(Continued)

FOREIGN PATENT DOCUMENTS

DE 10 2007 040 906 A1 3/2009
DE 10 2009 008 177 A1 10/2009
(Continued)

OTHER PUBLICATIONS

German Search Report dated May 29, 2013 with partial English-language translation (Nine (9) pages).
(Continued)

*Primary Examiner* — An Luu
(74) *Attorney, Agent, or Firm* — Crowell & Moring LLP

(57) ABSTRACT

A motor vehicle is provided having a control device, an electronic power unit and an energy storage system including first and second electric energy storage devices connectable in parallel so as to have a common base voltage at respectively different states of charge. The base voltage is substantially adjustable by the electronic power unit. A predictive energy management system executed by the control device determines a predefined setpoint value of a base voltage as a function of a predicted charge balance of the energy storage device.

18 Claims, 4 Drawing Sheets

(51) Int. Cl.
*H02J 7/00* (2006.01)
*H02J 7/14* (2006.01)
*B60R 16/033* (2006.01)

(52) U.S. Cl.
CPC ........ *B60L 11/1861* (2013.01); *B60R 16/033* (2013.01); *H02J 7/0003* (2013.01); *H02J 7/1423* (2013.01); *Y02T 10/7011* (2013.01); *Y02T 10/7016* (2013.01)

(56) References Cited

U.S. PATENT DOCUMENTS

| | | | |
|---|---|---|---|
| 6,844,634 B2 | 1/2005 | Kobayashi et al. | |
| 7,267,090 B2 * | 9/2007 | Tamai | B60L 11/1868 123/179.3 |
| 9,431,850 B2 * | 8/2016 | Imai | H02J 7/1423 |
| 2005/0228553 A1 | 10/2005 | Tryon | |
| 2009/0243387 A1 | 10/2009 | Conen et al. | |
| 2010/0312430 A1 | 10/2010 | Troncoso et al. | |
| 2011/0001352 A1 | 1/2011 | Tamura et al. | |
| 2011/0264317 A1 | 10/2011 | Druenert et al. | |
| 2013/0252035 A1 | 9/2013 | Lamp et al. | |

FOREIGN PATENT DOCUMENTS

| | | |
|---|---|---|
| DE | 10 2010 029 743 A1 | 1/2011 |
| DE | 10 2009 034 180 A1 | 2/2011 |
| DE | 10 2010 062 116 A1 | 5/2012 |
| JP | 2004-25979 A | 1/2004 |

OTHER PUBLICATIONS

International Search Report (PCT/ISA/210) dated May 30, 2014 with English-language translation (Four (4) pages).

\* cited by examiner

ENERGY MANAGEMENT FOR A MOTOR VEHICLE HAVING COUPLED ENERGY STORAGE DEVICES

CROSS REFERENCE TO RELATED APPLICATIONS

This application is a continuation of PCT International Application No. PCT/EP2013/069792, filed Sep. 24, 2013, which claims priority under 35 U.S.C. § 119 from German Patent Application No. 10 2012 217 184.3, filed Sep. 24, 2012, the entire disclosures of which are herein expressly incorporated by reference.

BACKGROUND AND SUMMARY OF THE INVENTION

The invention relates to a motor vehicle having at least one control device, having an electronic power unit and having an energy storage system. The energy storage system includes a first electric energy storage device and a second electric energy storage device which is connected in parallel, or can be connected in parallel, with the first electric energy storage device.

Owing to the number of electric loads in modern motor vehicles, the need to ensure the electrical supply during the development of the vehicle has recently been subjected to novel requirements. This leads to a situation in which relatively complex on-board power system architectures are proposed in order to be able to cover energy requirements in the vehicle. This is mentioned, for example, in DE 10 2009 008 177 A1.

In addition, the relatively complex on-board power system architectures, in particular on-board power system architectures of hybrid vehicles with a partially electrified drive train, require a complex energy management system in order to regulate energy flows in the vehicle in a targeted fashion. This is disclosed, for example, in US 2005/0228553 A1, in which a partially predictive energy management system for hybrid vehicles is described.

An object of the invention is to provide an improved motor vehicle having a control unit, having an electronic power unit and having an energy storage device. The energy storage system includes a first electric energy storage device and a second electric energy storage device which is connected in parallel, or can be connected in parallel, with the first electric energy storage device.

This and other objects are achieved by a motor vehicle having a control device, having an electronic power unit and having an energy storage system which comprises a first electric energy storage device and a second electric energy storage device which is connected in parallel, or can be connected in parallel, with the first electric energy storage device. According to the invention, the two energy storage devices have a common base voltage at respectively different states of charge. The base voltage is substantially adjustable by the electronic power unit. A predictive energy management system that can be executed on the control device determines a predefined setpoint value of the base voltage as a function of a predicted charge balance of the energy storage device.

This means that a base voltage which deviates from the common base voltage can be adjusted by the energy management system of the vehicle. The actual setting of the voltage is carried out by the electronic power unit, such as for example by a DC-DC converter, a generator or implicitly by a negative over-potential at the energy storage devices forming the energy storage device, as a result of a discharge current for supplying electric loads. The predefining of the base voltage by the energy management system is carried out in such a way that specific advantages of the energy storage devices forming the energy storage device are exploited in the imminent use profile of the vehicle.

According to one preferred embodiment of the invention, this is done in that the predictive energy management system increases the base voltage when there is an imminent use profile of the vehicle which gives rise to a predicted negative charge balance.

When a negative charge balance is present and when a negative charge balance is imminent, the base voltage is increased. The base voltage is therefore increased owing to the predicted negative charge balance even when there is a use profile which constitutes a well-balanced charge balance of the energy storage device at a particular time. In this way, the cycling of the energy storage devices can be shifted predictively in favor of reduced cycling of the one energy storage device and increased cyclic use of the other energy storage device. This is advantageous when an energy storage device with particularly fixed cycles is used. The energy storage device which has fixed cycles is preferably the energy storage device with the relatively low relative state of charge at a given coupling voltage, with the result that said energy storage device is operated below the increased cycle load.

In addition, the predictive energy management system increases the base voltage when there is an imminent stationary phase. As a result, the degree of cycling of the energy storage device is additionally shifted in the direction of the energy storage device with fixed cycles.

Furthermore it is advantageous if the predictive energy management system reduces the base voltage when there is an imminent use profile of the vehicle which gives rise to a predicted positive charge balance.

The base voltage of the energy storage device can be lowered if the imminent use profile of the vehicle indicates a positive charge balance. In this way, in particular, the recuperation potential in the case of a vehicle with a braking energy recovery function (BER), which is known to a person skilled in the art, is maintained. This increases the efficiency during the recovery of braking energy by way of a charge current which is increased owing to a lower state of charge and a higher over-potential when the recuperation voltage is applied.

The predictive energy management system determines, for an imminent time period, the charge balance of the energy storage device on the basis of a selection and/or a combination of the following data sources: navigation data, traffic information data, route-related weather data, detection data of a type of vehicle user, vehicle-to-vehicle communication data, route-frequency-detection data, status data of the electronic power unit and status data of the two electric energy storage devices such as the state of charge or temperature.

The energy management system, which can run as software on one or more vehicle control devices, has a plurality of information inputs of sensors of the vehicle, of actuators of the vehicle and of communication interfaces of the vehicle. On the basis of a current information situation, the energy management system determines a prediction of the charge balance of the energy storage device for a specific imminent period of use of the vehicle. The energy management system can also include self-learning algorithms. The predefining of the base voltage is carried out within defined limits which are characteristic of the electro-chemical properties of the energy storage device. In this context, the predefining of the base voltage in a first approximation is inversely proportional to the determined charge balance.

Possible sensors which are available to the vehicle are, in particular, battery sensors which are assigned to the respective energy storage devices and which record the voltage, current and temperature of the respective stores as a function of time.

The energy storage device can be implemented, for example, if the first energy storage device is embodied as a lead acid battery and the second energy storage device as a lithium-ion battery.

These two energy storage devices are advantageously characterized by partially overlapping open-circuit voltage characteristic curves, wherein the lead acid battery has a significantly lower discharge internal resistance at high current rates over all the relative states of charge than the lithium ion battery, and the lithium ion battery has a significantly lower charge internal resistance than the lead acid battery over all the relative states of charge.

The invention is based on the considerations presented below.

The starting point is a conventional vehicle on-board power system with an individual lead acid battery as an energy storage device for the basic on-board power system, wherein the vehicle is equipped, if appropriate, with micro-hybrid functionalities such as a braking energy recovery function and/or with an automatic engine stop/start system (MSA).

Operating strategies for the conventional on-board power system can include maximizing the service life of the lead acid battery (LAB). This can be achieved with the LAB technology known to a person skilled in the art, in particular in the case of permanent full charging of the LAB, i.e. when a full charging strategy is used. However, in order to provide the possibility of recuperation of electrical energy converted from kinetic energy even with the LAB, a selectively partially discharging operating mode of the LAB is selected, which mode can have a disadvantageous effect on the service life of the LAB. This can be particularly disadvantageous in unfavorable operating states if the state of charge of the LAB is additionally lowered by frequent stop phases by the MSA and by excessive discharging in the parking and running on phase of the vehicle.

Modern 2-battery concepts dispose of energy storage devices comprising different chemical technologies such as, for example, the combination of a lead acid battery (LAB) with a lithium ion battery (LiB).

In the case of energy storage devices which are connected in parallel in a voltage-neutral fashion, i.e. in the case of direct galvanic connection, a common voltage occurs at the energy storage devices, which voltage is referred to as a coupling voltage (common base voltage).

For a vehicle with such an energy storage device, an adept energy management system is proposed which makes predictive use of the specific respective advantages of the LAB and of the LiB specifically in the context of the energy storage device, i.e. in the presence of the respective other energy storage device.

Other objects, advantages and novel features of the present invention will become apparent from the following detailed description of one or more preferred embodiments when considered in conjunction with the accompanying drawings.

DETAILED DESCRIPTION OF THE DRAWINGS

According to one exemplary embodiment, the electric on-board power system of a motor vehicle includes, in addition to an electronic power unit such as a generator or a DC-DC converter and a starter for the internal combustion engine, at least one control device and electric loads. At least two electric energy storage devices which are connected in parallel, or can be connected in parallel, in the on-board power system serve both as energy sources and as energy sinks. These energy storage devices can have a direct galvanic connection, i.e. the energy storage devices can be operated continuously connected in parallel or a switching unit can be located between the two energy storage devices in order to connect them in parallel. In this context, voltage-coupling elements such as DC-DC converters, isolator switches, relays etc. can be used between the energy storage devices. The embodiment is related here substantially to the two energy storage devices in a parallel-connected design.

Furthermore, a system composed of two parallel energy storage devices is considered, said system being referred to in the text which follows as a coupling storage system.

In addition, one of the two energy storage devices, preferably both energy storage devices, is/are provided with a battery sensor, wherein the sensors are integrated into a data communication system such as, for example, a bus system of the vehicle. The sensors determine the voltage, current and temperature of the energy storage devices as a function of time. As a result, the state of charge of the respective energy storage devices and a state of charge of the energy storage device can be determined during the operation of the energy storage device by the battery sensors or by the control device of the vehicle in the form of integration of the current of the respective energy storage devices over time, which is formed from the respective charge currents and discharge currents of the two energy storage devices. This is essential for the prediction of the charge balance of the coupling storage system. The prediction is carried out by an energy management system (EM) which can run on a control device of the vehicle. The energy management system is referred to as a predictive energy management system.

Figure 1:
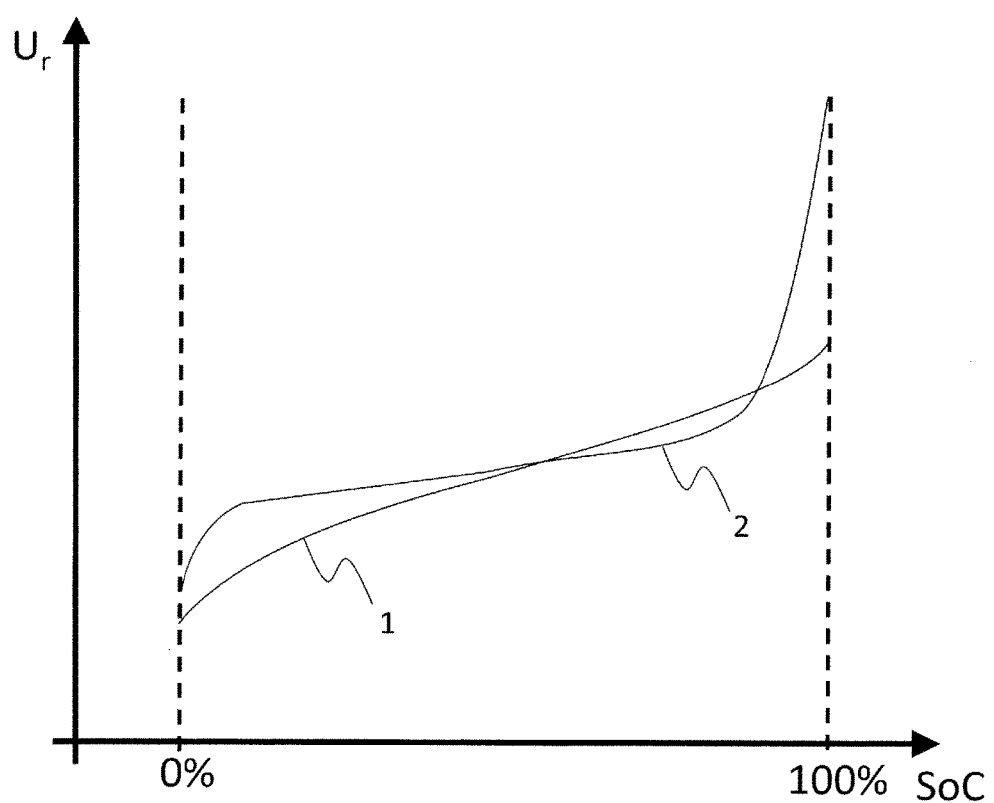
FIG. 1 is a graph showing the open-circuit voltage of two energy storage devices as a function of the relative state of charge.
Figure 2:
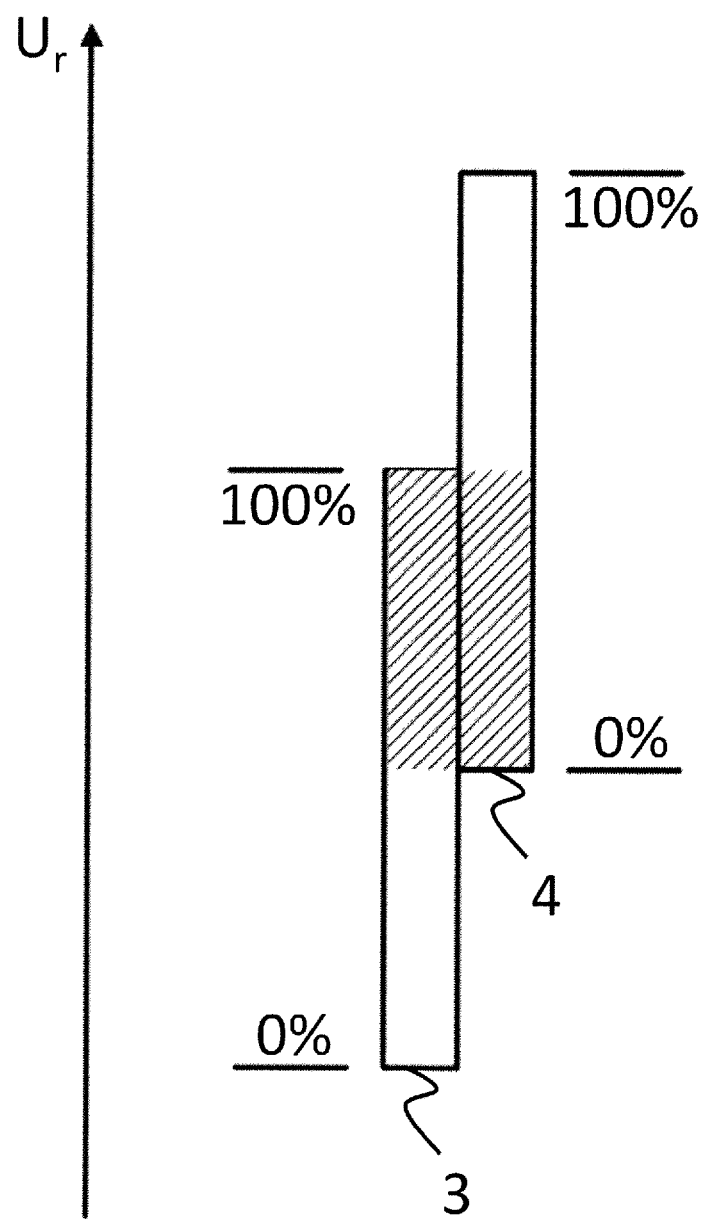
FIG. 2 is a graph showing the open-circuit voltage situation of the two energy storage devices in a coupling storage system.

Each of the two energy storage devices has a characteristic curve of the open-circuit voltage Ur as a function of the respective relative state of charge of the energy storage device, see FIG. 1. The open-circuit voltage characteristic curve (1) of the first energy storage device and the open-circuit voltage characteristic curve (2) of the second energy storage device are illustrated. The two energy storage devices behave in such a way that the open-circuit voltage characteristic curves of the two energy storage devices intersect at least partially essentially over the entire range of the relative state of charge. This is apparent from FIG. 2 with a first voltage range (3), which is covered by the first energy storage device, and a second voltage range (4), which is covered by the second energy storage device. This means that there is, in each case, a state of charge range of the energy storage device to which a voltage range of the respective open-circuit voltage characteristic curve is assigned and which is common to both stores. In addition, this means that there is, in each case, a state of charge range of an energy storage device to which a voltage range of the respective open-circuit voltage characteristic curve which is not covered by the respective other store is assigned, and there is, in each case, a state of charge range of an energy storage device to which a voltage range of the respective open-circuit voltage characteristic curve which is likewise covered by the respective other store is assigned (hatched area in FIG. 2).

Figure 3:
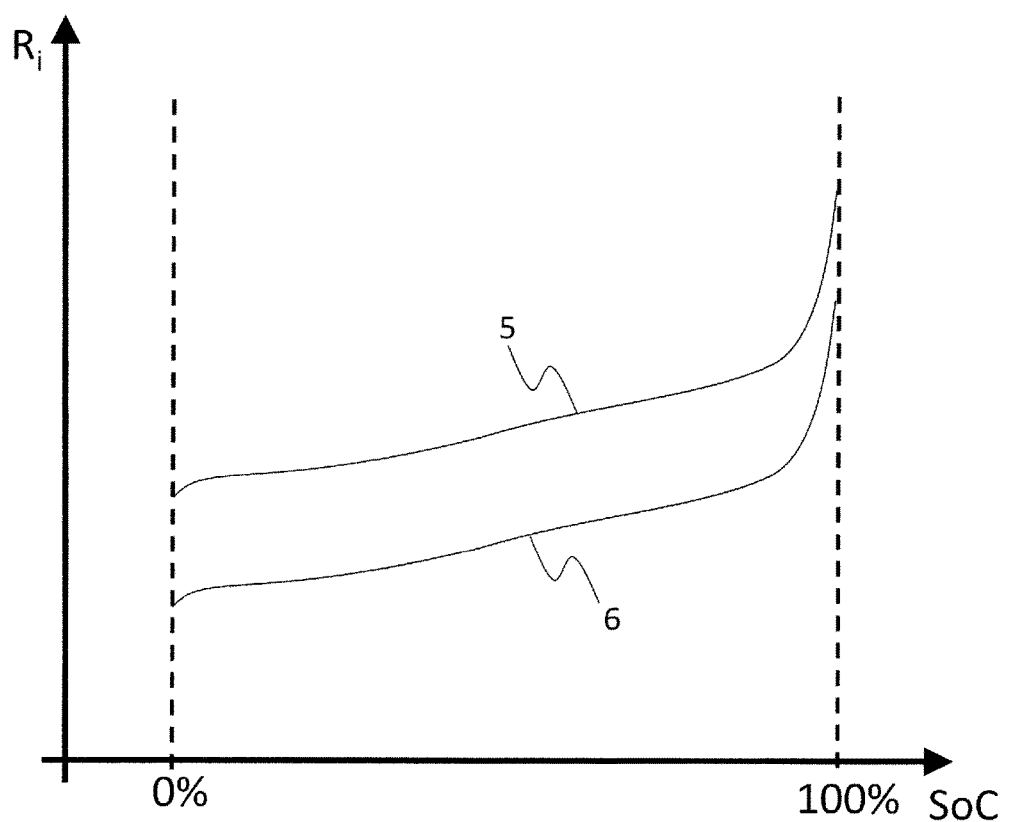
FIG. 3 is a graph showing the charge internal resistance characteristic curve of the two energy storage devices.
Figure 4:
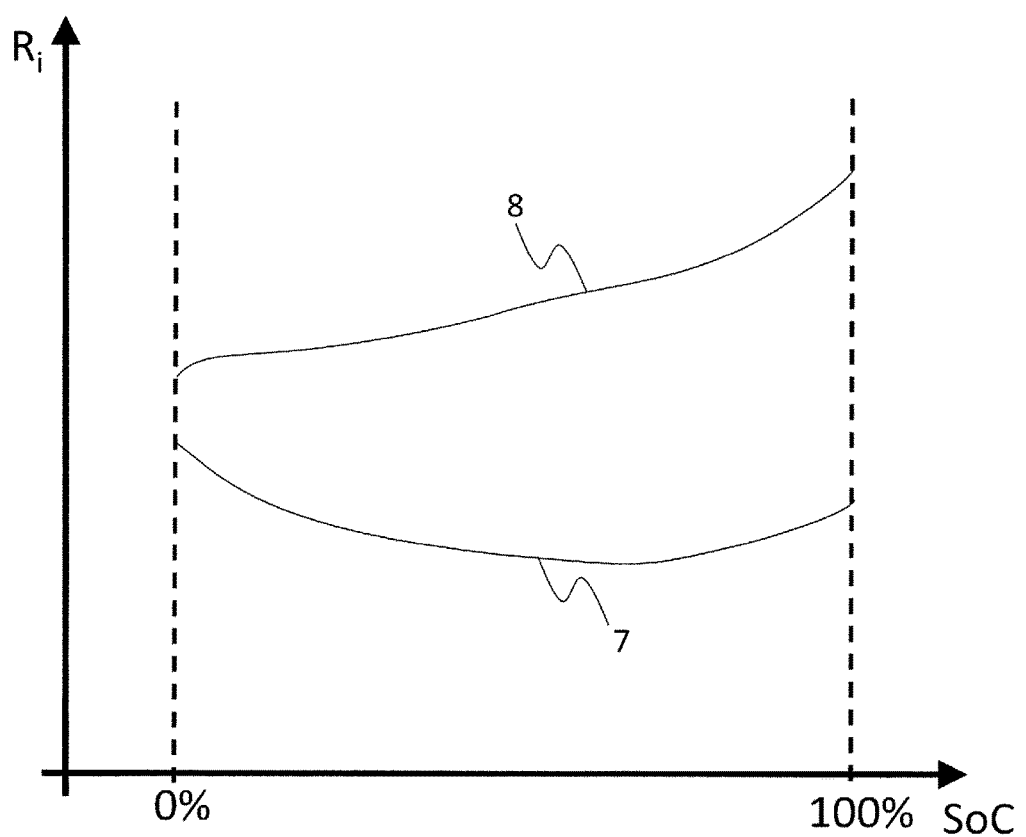
FIG. 4 is a graph showing the discharge internal resistance characteristic curve of the two energy storage devices.

The two energy storage devices each have a state-of-charge-dependent charge internal resistance characteristic curve and a state-of-charge-dependent discharge internal resistance characteristic curve. The internal resistance is denoted as Ri. The charge internal resistance characteristic curve of the first energy storage device (5 in FIG. 3) is located essentially in the entire relative state of charge range of 0% state of charge (SoC) up to 100% SoC in the direction of relatively high resistances above the charge internal resistance characteristic curve of the second energy storage device (6 in FIG. 3). The discharge internal resistance characteristic curves behave in an inverse fashion at high current rates, i.e. the discharge internal resistance characteristic curve of the first energy storage device (7 in FIG. 4) is located essentially in the entire relative state of charge range below the discharge internal resistance characteristic curve of the second energy storage device (8 in FIG. 4). High current rates, in particular, are currents of more than 100-200 A.

The described relative positions of the internal resistance characteristic curves can have anomalies in the edge regions of the relative state of charge range, i.e. at and near to 0% as well as at and near to 100% of the state of charge (SoC), which anomalies exhibit a different profile in these edge regions than the described essential profile. The advantages and effects of the invention are not influenced by these anomalies, with the result that the anomalies do not restrict the invention. An example which can be mentioned is, for example, a strong rise in the discharge internal resistant characteristic curve in the case of a lead acid battery as the first energy storage device toward the state of charge 0%, which possibly exceeds the discharge internal resistance characteristic curve of a lithium ion battery as the second energy storage device toward the state of charge 0% in the direction of the relatively high resistance, in particular at low current rates. However, the discharge internal resistance characteristic curve of the lead acid battery in the direction of relatively high resistances runs below the discharge internal resistance characteristic curve of the lithium ion battery.

Furthermore, the considerations of the resistance characteristic curves relate to a temperature range which, in the case of an application in automobile manufacture, is considered to be a typical temperature range for an energy storage device, i.e. −20° C. to approximately +60° C.

Examples of the predictive energy management system of the coupling storage system include, without restricting the generality, a lead acid battery (LAB) using wet technology or using AGM technology as the first energy storage device with an open circuit voltage situation of 10.5 volts to approximately 13.0 volts and a lithium ion battery (LiB) as the second energy storage device. The LiB is constructed, for example, from a series connection of four cells of the electrochemical redox system of lithium iron phosphate (LiFePO4)/graphite in the case of an open circuit voltage situation of 10.4 volts to 14.0 volts, or of four cells of the electro-chemical redox system of lithium-nickel-manganate-cobalt (Li-NxMyCz)/graphite in the case of an open circuit voltage situation of 12.6 volts to 16.4 volts, or of six cells of the electro-chemical redox system of lithium-nickel-manganate-cobalt (Li-NxMyCz)/lithium titanate (LixTiyOz) in the case of an open circuit voltage situation of 12.0 volts to 15.6 volts. The second energy storage device can also be embodied as a supercapacitor.

Without restriction to one of the illustrated variants, the design of the LiB with the lithium-iron-phosphate/graphite system will also be considered for the predictive energy management system of the coupling storage system. In this context, a system with an exemplary rated capacity of the LiB of 5-20 Ah and of the LAB of 70-90 Ah will be proposed.

In the case of the coupling storage system, the same electrical potential, referred to as the coupling voltage, is present at every operating time owing to the direct galvanic connection. This voltage can deviate from a setpoint voltage which is predefined by the energy management system. The predefined setpoint voltage is referred to as the basic voltage.

The LAB has an open circuit voltage range of approximately 10.5 volts to 13.0 volts in a state of charge range of approximately 0% to 100%. The LiB has an open circuit voltage range of approximately 10.4 volts to 13.2 volts in a state of charge range of approximately 0% to 80%, wherein the entire state of charge range of approximately 25% to 80% is located virtually at an open circuit voltage situation of 13.2 volts. In the case of an open circuit voltage of 13.0 volts, the state of charge of the LiB is approximately 15%.

In addition, the LAB has an open circuit voltage range of approximately 12.6 volts to 13.0 volts in a state of charge range of approximately 75% to 100%. The maximum charge voltage of the coupling storage system is 14.80 volts, without restricting the generality. The LiB has an open circuit range of approximately 10.4 volts to 13.2 volts in a state of charge range of approximately 0% to 80%, wherein the entire state of charge range of approximately 25% to 80% is located virtually at an open circuit voltage situation of 13.2 volts. In the case of the LAB, when there is an over-potential starting from 400-500 mV above the open circuit voltage situation, appreciable charging of the battery occurs, and in the case of the LiB it occurs approximately from 30-50 mV of over-potential above the open circuit voltage situation.

Accordingly, the coupling storage system exhibits the following states approximately, and at moderate temperatures, for example room temperature, on the basis of the storage properties forming the system, in an operating state in the case of the coupling voltage of approximately 13.0 volts (i.e. in the case of a state of charge of the LAB of approximately 95-100% and in the case of a state of charge of the LiB of approximately 15%) depending on a base voltage $U_B$ which is set:

14.8 volts≥$U_B$≥13.4 volts: strong charging of the LiB (charge current approximately >25 A), charging of the LAB, 13.4 volts≥$U_B$≥13.2 volts: significant charging of the Li-ion battery (approximately 5 A<charge current<25 A), slight charging of the AGM battery (charge current approximately <5 A), 13.2 volts≥$U_B$≥13.0 volts: almost exclusively discharging of the LiB, and 13.0 volts≥$U_B$≥0 volts: discharging of both energy storage devices.

In this context, the base voltage is to be differentiated from the coupling voltage: the coupling voltage is the set potential of the two energy storage devices which is set in common by the coupling storage system. The base voltage is a potential which can be applied and controlled externally.

The control of the base voltage, i.e. the predefined setpoint voltage of the predictive energy management system, is carried out by the electronic power unit, preferably one or more electric machines which operate as a generator, such as a vehicle generator. As an alternative to the generator, the predefined setpoint voltage is converted into the base voltage by, for example, a DC-DC converter.

In this context, a predefined setpoint voltage is transmitted from the control device to a regulator of the generator, which is assumed below. The base voltage is controlled by the generator by repeated predefinition of the setpoint voltage of the control device. The predefining of the setpoint voltage of the control device takes place within the scope of the predictive energy management system of the vehicle, implemented as software executed on the control device, on the basis of the determined charge balance for an imminent time period, which is referred to as the observation time period. The imminent time period preferably coincides with periods of use of the vehicle (e.g. route sections) which have a characteristic effect on the charge balance.

The determination of the charge balance and the predefining of the setpoint voltage which is associated therewith are carried out at a chronological repetition rate in order to correct the predefined setpoint voltage iteratively. The regulating objective is a well-balanced charge balance over a time period which includes the imminent time period. The fact of the well-balanced state of the charge balance can, in this sense, therefore only be detected retrospectively. It is particularly for this reason that the energy management system is referred to as predictive.

The time period of the application of the setpoint voltage is referred to as a control time period. According to the prediction of the energy management system, the control time period occurs chronologically before the observation time period, if appropriate also at the beginning of the observation time period. As a result of the chronological repetition, intermediate satisfaction of the regulating objective is checked and, if appropriate, for example in the case of an unexpectedly high or low energy consumption, the predefined setpoint voltage is adapted. Deviations in energy consumption can change, for example, as a result of an unexpected change in the driving behavior or unexpectedly intensive use of electric loads.

According to this exemplary embodiment, the base voltage is selected as a function of time by the predictive energy management system of the coupling storage system in such a way that the advantages of the two technologies of the energy storage devices LAB and LiB can be used in as far as possible all operating phases.

In this context, a vehicle is assumed which has, in particular, the functions of braking energy recovery (BER) and an automatic engine stop/start function (MSA).

In the case of the BER, a brief rise in the voltage at the output of the electronic power unit is achieved by briefly tapping an increased torque from the drive shaft of the engine. The brief tapping is directed here to overrun phases and braking phases in which the engine is entrained, without its own drive, by the kinetic energy of the vehicle. Instead of converting the kinetic energy into heat in a brake system of the vehicle, the excess kinetic energy can be converted into electrical energy and stored in the coupling storage system. The more favorable the current consumption of the energy storage system, the more efficient this conversion can be.

In the case of the MSA function, the internal combustion engine is shut down in stop phases of the vehicle during the ongoing driving mode (for example, during a red phase at a traffic light) and started again automatically at the start of a following driving phase.

The predefining of the setpoint voltage, i.e. the base voltage which is to be set, takes place essentially on the basis of the criterion of the charge balance which is determined with respect to the current driving state of the vehicle and with respect to a future driving state of the vehicle by the predictive energy management system.

The operating strategy of the energy management system for the coupling storage system is based on the fact that the more negative the charge balance the higher the base voltage which the control device predefines. For example, a voltage of 13.3-13.6 volts can be cited. As a result, in the case of a driving profile with a negative charge balance, the frequent engine stop phases with discharging of the coupling storage system and subsequent high current loading owing to the start resulting in such a high degree of discharging of the LAB are prevented, and during the warm start an unstable electrical voltage situation which can arise in the on-board power system is prevented. This is due to the relationship according to which when there is high current loading from the coupling storage system the current drain occurs predominantly from the LAB, which in this embodiment is attributed to the relatively low discharge internal resistance of the LAB compared to the LiB. A voltage-assisting function by the LiB can therefore be achieved only when the state of charge of the LiB is above a minimum value of approximately 0-5% owing to the open circuit voltage characteristic curve, which is known to a person skilled in the art.

A driving profile with a negative charge balance occurs, in particular, when engine stop phases of the MSA function with a subsequent warm start accumulate over time. This relates, in particular, to routes with a high proportion of city driving.

The predictive EM detects such accumulation, for example on the basis of the input navigation data, i.e. on the basis of the imminent route. The proportion of the imminent route which is within built-up areas relative to the proportion of the imminent route which is not, can serve as a parameter $\alpha$ in order to adjust the base voltage between a reference voltage (for example 13.0 volts in the explained system, in FIG. 2 at the upper edge of the hatched area in the direction of increasing open circuit voltage) and a maximum permissible voltage value (maximum voltage in the text which follows) for protecting the energy storage devices from continuous over-voltage (for example 14.8 volts in the explained system) in a linear correlation according to the parameter $\alpha$.

Traffic information data, for example RTTI (real time traffic information) serves as a further data source for the predictive energy management system. If, for example, a traffic jam (regardless of whether it is outside or inside a built up area) on an imminent route is signaled, the predictive EM adjusts the predefined setpoint value of the base voltage in the upward direction. This can be done, for example, according to a parameter $\beta$ which indicates the proportion by which the imminent travel is lengthened by the traffic jam.

A negative charge balance can also be detected by the predictive EM in the case of extreme temperature conditions. If a journey is started under extreme external temperature conditions, the base voltage is increased between the reference voltage and the maximum voltage by a parameter γ which correlates with the temperature difference between the external temperature of a reference temperature value. In the case of extreme external temperatures, increased demand by heating systems, ventilation systems and air conditioning systems in the vehicle can be assumed. In addition, the energy efficiency and power efficiency of the two energy storage devices can be adversely affected at extreme temperatures.

For example, the coupling voltage is raised by setting the base voltage before travel with a negative charge balance from 13.0 volts to 13.3 volts, in order to make it possible to compensate the negative charge balance before the start of travel. This is advantageous since the recuperation energy which occurs as a result of BER during a journey with a negative charge balance does not compensate enough for the requested energy consumption.

The increased base voltage serves in this case to increase or maintain the state of charge of the coupling storage system. The resulting, slight counteracting of the efficiency of the recuperation by the increasing internal resistance of the LiB with the increasing state of charge is irrelevant here. Owing to the initial position of the negative charge balance on which this case is based, the increasing discharge clearly cannot be compensated by the recuperated energy even though a reduced state of charge, which favors the recuperation efficiency, is present.

The increase in the base voltage therefore brings about stabilization of the voltage situation in the on-board power system and an increase in the availability of the MSA function with only slightly reduced potential for recuperation. Furthermore, an increased state of charge when the driving mode ends serves as an electric energy reserve for the transition into the state of rest of the vehicle. This transition is referred to as running on and requires energy of an order of magnitude of up to 2 Ah after the end of the driving mode, depending on the type of vehicle.

In contrast, continuous setting of the predefinition of a basic voltage of 13.3 volts, which is not limited to driving profiles with a negative charge balance, is disadvantageous for the system since this would result in slow full charging of the LiB. This would result in an inefficient recuperation potential since the current capacity of the LiB becomes larger as the state of charge increases, and the available over-potential additionally drops as a result of a rise in open circuit voltage.

The higher the predicted demand of run-on energy, the higher the base voltage which has to be set to provide an energy reserve in the coupling storage system during travel. Without increasing the base voltage during travel or towards the end of travel, the energy for the run-on is extracted from a coupling storage system with possible emptying of the LiB and partial discharging of the LAB. This gives rise to increased cycling of the LAB, which acts in an accelerating fashion on the aging and the wear of the LAB owing to the relatively low cycle lifetime of the LAB. In order to ensure a high level of availability of the coupling storage system, the LAB is to be protected against excessive cycling.

In other words, the raising of the base voltage ensures that a quantity of energy is kept in reserve in the LiB which, as expected, is extracted from the LiB at relatively late times (for example, during run-on) without extracting charge from the LAB. This means that predictively initiated raising of the coupling voltage (by applying the predefined base voltage) leads to a situation in which within the coupling storage system the cycling load of the coupling storage system is borne by the LiB even when a negative charge balance occurs. It is to be noted here that the relatively high discharge internal resistance of the LiB compared to the discharge internal resistance of the LAB in the case of a discharge current which is low compared to a warm start does not rule out this discharge current being primarily extracted from the LiB (and not from the LAB) insofar as the effect of the increased base voltage occurs in the described way.

The design of a negative over-potential at the LAB which would firstly lead to discharging of the LAB requires a negative over-potential at the LiB of a level which exceeds the potential difference between the open circuit voltage of the LAB and the applied base voltage. In other words, at the given discharge current, this potential difference at the discharge internal resistance of the LiB can drop before significant discharging of the lead acid battery occurs. A voltage drop at the discharge internal resistance of the LiB to such an extent that the coupling voltage brings about a negative over-potential at the LAB only occurs starting from a high current which is higher than approximately 100 A (for example, warm start current) in the case of the selected system. In this situation, the relatively low discharge internal resistance of the LAB compared to the LiB has an effect, with the result that the (other) predominant part of the warm start current is provided by the LAB. In this context the LiB, with its relatively high discharge internal resistance and relatively low current proportion of the warm start current, supports the voltage of the LAB.

In addition, it is to be noted that an increased base voltage in the driving mode brings about a relatively low efficiency of the recuperation potential since the potential difference at the LiB, which is additionally applied by the recuperation voltage, is reduced and the charge internal resistance is increased owing to the preceding charging.

The operating strategy of the predictive EM for the coupling storage system is also based on the fact that the more positive the charge balance the lower the base voltage which is predefined by the control device. In the selected exemplary embodiment, the voltage is reduced to a value of 13.0 volts. As a result, given a driving profile with a positive charge balance in which, typically, a high degree of recuperation energy is to be expected, the state of charge of the LiB increasing in the direction of an increasing state of charge to such an extent that the recuperation efficiency drops is prevented. The reduction in the base voltage increases the discharge current of the LiB, as a result of which the generator can be relieved. The relieving of the generator results in reduced fuel consumption and in an improved CO2 balance of the vehicle.

There is a resulting driving profile with a positive charge balance in particular in the case of chronological accumulation of additionally relatively long overrun phases. This relates primarily to long freeway journeys. In this context, engine stop phases with a subsequent warm start are improbable and relatively long driving phases without activation of the accelerator pedal (for example coasting in backed-up traffic) which is suitable for recuperation are probable.

A further reduction in the base voltage can occur as the temperature of the LiB rises since a rise in temperature activates the charging reaction.

The lowered base voltage gives rise to discharging of the electronic power unit. In addition, the coupling storage system is prepared for imminent recuperation phases in which the charge acceptance of the LiB can be used efficiently. This is based on the high over-potential which is brought about by the raising of the voltage in a recuperation phase compared to the base voltage.

The illustrated embodiments have in common that the operation of the coupling storage system on the basis of the determined prediction result is where the emphasis of the present document lies. Furthermore, various examples are given which disclose the determination of such a prediction result which is relevant for the operation of the coupling storage system and are not explicitly tied to an embodiment of the first energy storage device as a secondary lead acid battery, and of the second energy storage device as a secondary lithium-ion battery or to a vehicle with MSA and BER.

The temperature of the energy storage device or energy storage devices can be determined using the battery sensor or sensors (referred to below as battery sensor system). The temperature has a significant influence on the charging capacity which can be achieved and the discharging capacity which can be achieved (capacity status in the text which follows) which can be stored by use of predefined characteristic diagrams. The predefined setpoint voltage is determined by the EM on the basis of the determined current performance of the energy storage device, i.e. the base voltage which is necessary to achieve a desired imminent change in the charge balance is determined. The determination of the performance status can extend not only to current characteristic variables such as the temperature, the current and the voltage, but also additionally to data which is acquired and calculated over a relatively long time period, such as the internal resistance and/or cycles which can be weighted with aging factors. As a result, an even more precise prediction of the performance and therefore of the required base voltage can be achieved.

The route profile is present by virtue of the navigation data. In one advantageous development, said route profile can be combined with current traffic information data, for example by means of RTTI and/or vehicle-to-vehicle communication. In addition, weather data, in the simplest sense relating to an external temperature measurement and/or online communication, can be used, since, for example, heavy precipitation has a significant effect on the expected traffic conditions. As a result, sectors are determined along the route profile, said sectors differing in terms of their expected profile. For example, this may be a division into stop & go traffic which is typical of a city center, freely moving traffic in a city when approaching the city boundary, cross-country traffic when leaving the city and subsequently again in city traffic with the arrival at a destination in an area with little traffic. A predefined setpoint value of the base voltage can be determined for each sector, for example as 13.6 volts for stop & go traffic which is typical of an inner city, as 13.2 volts for freely moving city traffic and as 13.0 volts for cross-country traffic.

In a simplified form, corresponding sector detections (also referred to as detection route profile) can also occur reactively, for example if a navigation route is known. In this case, a route detection can be used by averaging the vehicle speed in the most recent operating time. In order to ensure a stable regulating behavior, a hysteresis time within the range of several minutes is recommended for this. For relatively fast recognition of changes of a situation it is additionally possible to use a change in gradient. For example, an average speed of 90 km/h indicates cross-country traffic with corresponding reduction of the predefined setpoint voltage. If the average speed is suddenly reduced to 50 km/h and maintained for the hysteresis time, the EM can suspend the formation of mean values and change the sector detection directly to "locality" since the vehicle has supposedly entered a locality. In order to avoid incorrect detections, for example with the result of slow road users which are overtaken shortly afterwards, the hysteresis time is set to values in the range of 30 seconds.

In addition, the sector detection can be adapted by further reactive algorithms of the EM. An example of this is expected freely moving city traffic which, however, develops into intensive stop & go traffic owing to a traffic jam which is not known via traffic information. In this case, the evaluation of the route profile is changed in the evaluation logic to stop & go traffic with a corresponding increase in the predefined setpoint voltage. A further influencing factor for the evaluation of the sectors is the behavior of the vehicle driver. Differences here may be, for example, the use of MSA function or the braking behavior, for example brief, strong braking procedures versus predictive "coasting". The associated differences in the charge balance formation are used during the sector calculation. The basis for this are self-learning algorithms of the EM, which learn relevant driver behaviors. Modern vehicles which have various driver profiles and which can be selected with driver authentication by key or menu, permit a better learning function since the algorithm evaluates the detected driver.

Likewise, data of the electronic power unit or of the generator are acquired. It is still assumed that there is a generator. If the state thereof permits only restricted performance, it is possible, for example, to feed less recuperation energy into the energy storage devices. This can be allowed for by increasing the base voltage even before the means for regulating the state of charge takes countermeasures in the sense of increasing the predefined setpoint voltage as a result of a dropping state of charge.

Likewise, the level of the energy demand of the on-board power system can be calculated from the known currents of the energy storage devices and of the electronic power unit. Said demand varies as a function of the electric loads used in the vehicle, wherein specifically electric heaters have very high energy demand levels. The expected on-board power system current is also taken into account in the route evaluation, in the form of the determination of the energy quantities which are necessary for MSA stop phases.

Depending on the destination and/or driver it is also possible to use learning functions which typically learn stationary times and stationary use behaviors of the required quantity of energy. As a result, for the last sector of a route it is possible to determine the state of charge which is to be kept available up to the end of the journey and which is required to be able to supply energy demand levels in the vehicle in a stationary phase or state of rest from the second energy storage device. Specific intensive stationary use (for example listening to the radio) or, for example, relatively long stationary phases at airports or shutting down of the vehicle for several days increases the energy demand for the stationary phases (for example the open circuit current acting as a result of a relatively long time). The detection of which can be learned by means of algorithms. Combination with the driver profile and/or navigation destination is advantageous here.

Overall, the predictive energy management system, in combination with the coupling storage system, makes it possible to use the specific advantages of the energy storage devices which form the coupling storage system. The energy management system can be applied to coupling storage systems with a rated voltage situation of 14 volts to 48 volts.

The targeted and predictive use of the specific advantages of the energy storage devices which form the coupling storage system give rise to a high level of stability and availability of the on-board energy system together with a reduction in fuel consumption and CO2 emissions of the entire vehicle as a result of increasing recuperation efficiency, early relieving of the generator and intensive use of many MSA stop phases.

The predictive energy management system also has the effect of lengthening the service life of the LAB. The precisely targeted use of the coupling storage system also permits cost-effective design of the system in respect of the capacity levels to be selected for the energy storage devices.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle, comprising:
   an electronic power unit;
   a control device;
   an energy storage system comprising a first electric energy storage device and a second electric energy storage device, the first and second electric energy storage devices being connectable in parallel, wherein the first and second electric energy storage devices have a common coupling voltage at respectively different states of charge,
   a base voltage is substantially adjustable by the electronic power unit, and
   a predictive energy management system is executed on the control device to determine a predefined setpoint value of the base voltage as a function of a predicted charge balance of the energy storage device.

2. The motor vehicle according to claim 1, wherein the predictive energy management system increases the base voltage when an imminent driving profile having a predicted negative charge balance occurs.

3. The motor vehicle according to claim 2, wherein the predictive energy management system reduces the base voltage when an imminent driving profile having a predicted positive charge balance occurs.

4. The motor vehicle according to claim 1, wherein the predictive energy management system reduces the base voltage when an imminent driving profile having a predicted positive charge balance occurs.

5. The motor vehicle according to claim 1, wherein the predictive energy management system increases the base voltage when an imminent stationary phase occurs.

6. The motor vehicle according to claim 2, wherein the predictive energy management system increases the base voltage when an imminent stationary phase occurs.

7. The motor vehicle according to claim 3, wherein the predictive energy management system increases the base voltage when an imminent stationary phase occurs.

8. The motor vehicle according to claim 1, wherein the predictive energy management system predicts, for an imminent time period, a charge balance of the energy storage system based on a selection of one or more of the following data sources: navigation data, traffic data, type of vehicle user data, vehicle-to-vehicle communication data, route-frequency detection data, electronic power unit status data, or charge state or temperature status data of the first and second electric energy storage devices.

9. The motor vehicle according to claim 1, further comprising:
   a first battery sensor assigned to the first electric energy storage device, and
   a second battery sensor assigned to the second electric energy storage device.

10. The motor vehicle according to claim 9, wherein the first electric energy storage device is a lead acid battery and the second electric energy storage device is a lithium-ion battery or a super capacitor.

11. The motor vehicle according to claim 1, wherein the first electric energy storage device is a lead acid battery and the second electric energy storage device is a lithium-ion battery or a super capacitor.

12. A method of operating a motor vehicle having a control device, an electronic power unit and an energy storage system comprising first and second electric energy storage devices connectable in parallel with one another, the method comprising the acts of:
    predicting a charge balance of the energy storage system, wherein the first and second electric energy storage devices have a common base voltage at different charge states;
    determining a predefined setpoint value for the common base voltage as a function of the predicted charge balance of the energy storage system; and
    adjusting, via the electronic power unit, the base voltage in accordance with the determined predefined setpoint value.

13. The method according to claim 12, further comprising the act of increasing the base voltage when there is an imminent driving profile of the vehicle having a predicted negative charge balance.

14. The method according to claim 12, further comprising the act of reducing the base voltage when there is an imminent driving profile of the vehicle with a predicted positive charge balance.

15. The method according to claim 13 further comprising the act of reducing the base voltage when there is an imminent driving profile of the vehicle with a predicted positive charge balance.

16. The method according to claim 12, further comprising the act of increasing the base voltage when there is an imminent stationary phase of the vehicle.

17. The method according to claim 15, further comprising the act of increasing the base voltage when there is an imminent stationary phase of the vehicle.

18. The method according to claim 12, wherein the act of predicting the charge balance of the energy storage system is carried out by predicting, for an imminent time period, the charge balance of the energy storage system based on a selection of one or more of the following data sources: navigation data, traffic data, vehicle user type data, vehicle-to-vehicle communication data, route-frequency data, electronic power unit status data, charge state status data of the first and second electric energy storage devices, or temperature status data of the first and second energy storage devices.

* * * * *